H. K. RAYMOND AND I. R. RENNER.
BEAD CORE FOR PNEUMATIC TIRES.
APPLICATION FILED JUNE 11, 1917.

1,310,212.  Patented July 15, 1919.

INVENTORS,
H. K. Raymond and I. R. Renner,
BY Robert M. Pierson
ATTORNEY

UNITED STATES PATENT OFFICE.

HARRY KING RAYMOND AND IRVIN R. RENNER, OF AKRON, OHIO, ASSIGNORS TO THE B. F. GOODRICH COMPANY, OF NEW YORK, N. Y., A CORPORATION OF NEW YORK.

BEAD-CORE FOR PNEUMATIC TIRES.

1,310,212.   Specification of Letters Patent.   Patented July 15, 1919.

Application filed June 11, 1917. Serial No. 174,062.

*To all whom it may concern:*

Be it known that we, HARRY KING RAYMOND and IRVIN R. RENNER, citizens of the United States, residing at Akron, in the county of Summit and State of Ohio, have invented certain new and useful Improvements in Bead-Cores for Pneumatic Tires, of which the following is a specification.

This invention relates to the construction of extensible and semi-extensible beads for pneumatic tires of the clencher type adapted to be used with either a solid rim or one which is transversely split or one having a quick-detachable or "Q. D." side-ring. Our object is to provide a bead core of ample strength which can be manufactured at a lower cost than those heretofore used.

The cores for soft-bead clencher tires, which have to be sufficiently extensible to get them over the flanges of a solid rim, have heretofore usually been made of a plastic compound containing a large proportion of rubber, usually of the reclaimed or cheaper grades. Such a bead depends for its strength principally upon the canvas plies which are wrapped around the core. In the case of clencher beads for use with rims having removable side rings it is desirable to have some degree of extensibility in order more readily to work the tire casing laterally on and off the rim when the detachable side-ring is removed, and the cores of such beads are frequently made of relatively small rubberized fibrous threads, either wound circumferentially around and around in a mold to make an endless core, or in the form of strips of woven fabric torn from a sheet of frictioned fabric, molded, cut to length and spliced. In the latter case, the cross threads perform no useful function, and in either case, the bead core contains more rubber than is necessary, both methods of making the beads being relatively expensive.

According to our present invention, we make the beads of relatively large cabled cords each composed of a plurality of smaller cords or threads formed of twisted yarn such as cotton yarn. The cabled cords are suitably coated with rubber, as by running them through a bath of cement, are collected in a bundle and cured in molds, the resulting product being cut up into the necessary lengths whose ends are spliced together to make the annular core. When used for a soft-bead clencher tire, the bundle of rubberized cabled cords is twisted before being molded.

Of the accompanying drawings.

Figure 5:
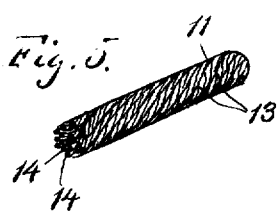
Fig. 5 is a similar view showing one of the cords enlarged.

In the drawings, 10 represents the bead core as a whole, 11, 11 are the cabled cords composing the same, and 12 is the rubber which coats the said cords and connects them together. This rubber is preferably applied in the form of cement by running the cords separately through a bath of rubber solution, and as the cords are relatively large in cross section, the amount of rubber present is reduced and there is very little impregnation of the cords. Each cord 11, as shown in detail in Fig. 5, is composed of a number of smaller cords 13, in this case six outer and one central cord twisted together into a cable, and each of the smaller cords in turn is composed of a number, for example three, strands 14 of twisted fibrous yarn, such as cotton yarn. Ample strength can be secured with a relatively-cheap, short-staple yarn owing to the fact that a number of smaller cords of this yarn is cabled together into a large cord.

Figure 1:
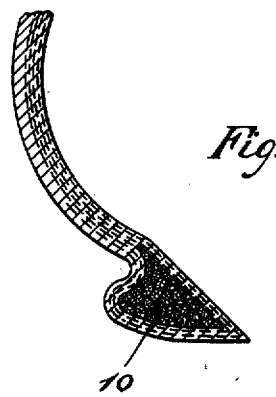
Figure 1 is a cross section showing part of a tire casing having a bead constructed according to our invention.
Figure 2:
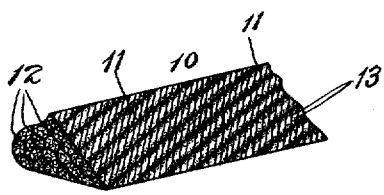
Fig. 2 is a perspective sectional view showing a fragment of the bead core made of cords twisted together for a soft-bead tire.
Figure 3:
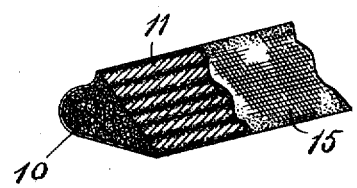
Fig. 3 is a similar view with the cords laid straight for a bead adapted to be used on rims having detachable side rings, this view showing also a portion of the fabric cover.
Figure 4:
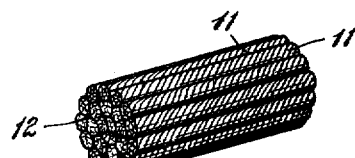
Fig. 4 is a similar view of the bundle of cords before being molded.

On emerging from the cement bath, the cords 11 are progressively brought together into a circular bundle, as shown in Fig. 4, and the article is then vulcanized in the usual bead mold to cure the rubber and impart the cross-sectional form shown in Figs. 1, 2 and 3. In the case of a soft-bead core for a tire to be used on a solid clencher rim, the bundle of cords before being molded is twisted so that the core will have the construction shown in Fig. 2, which imparts an added degree of stretchability. For a semi-extensible clencher bead, the cords 11 are left straight, as indicated in Fig. 3. This view shows the usual fabric bead cover 15.

We claim:

1. A pneumatic tire casing having a clencher-shaped bead whose core comprises a series of parallel cords each consisting of smaller cords cabled together, each of said smaller cords including a number of intertwisted strands of fibrous yarn, together with vulcanized rubber connecting the larger cords and of relatively-small volume compared with that of said cords, the whole forming an extensible bead.

2. A pneumatic tire casing having a clencher-shaped bead whose core comprises an intertwisted series of parallel cords, each composed of smaller cords which in turn are composed of fibrous yarn, together with vulcanized rubber in relatively-small volume connecting the larger cords, the whole forming an extensible bead.

In testimony whereof we have hereunto set our hands this 9th day of June, 1917.

HARRY KING RAYMOND.
IRVIN R. RENNER.

Copies of this patent may be obtained for five cents each, by addressing the "Commissioner of Patents, Washington, D. C."